(No Model.)
R. ROOD.
REGISTER FOR SHIPS' LOGS.
No. 397,661. Patented Feb. 12, 1889.
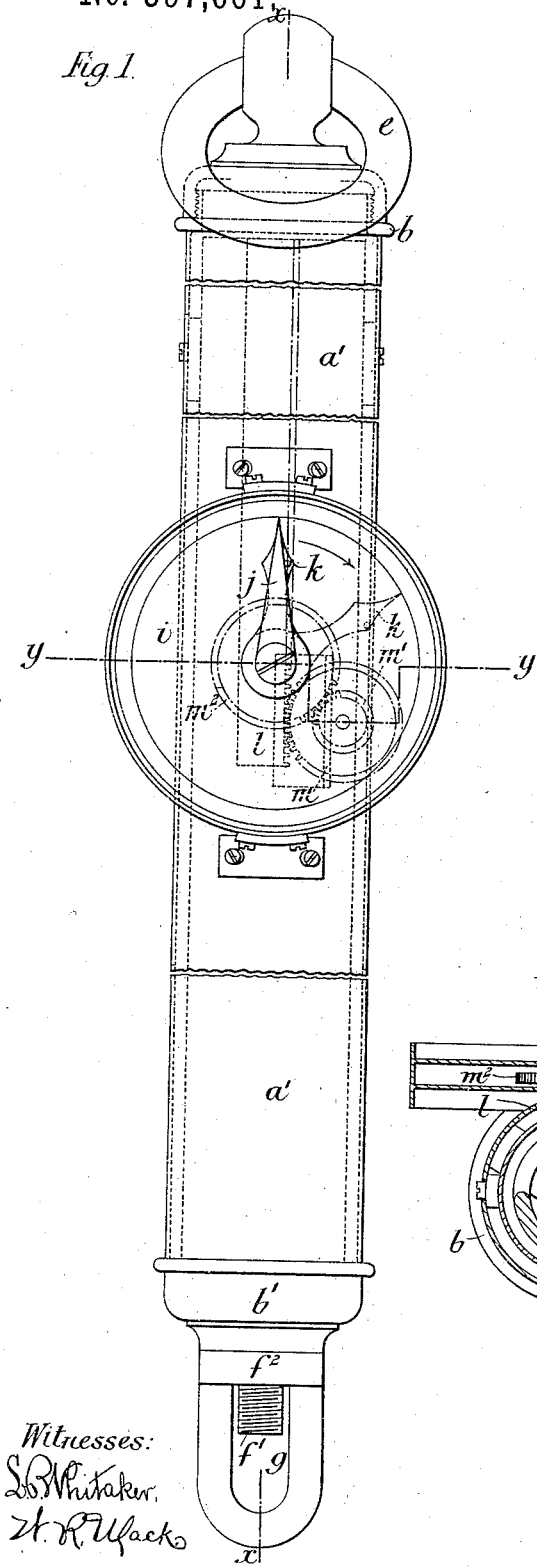
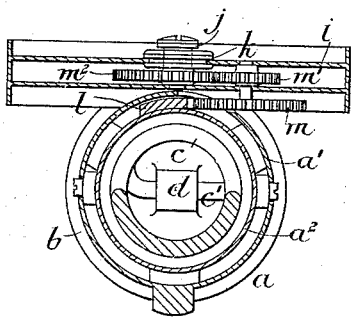
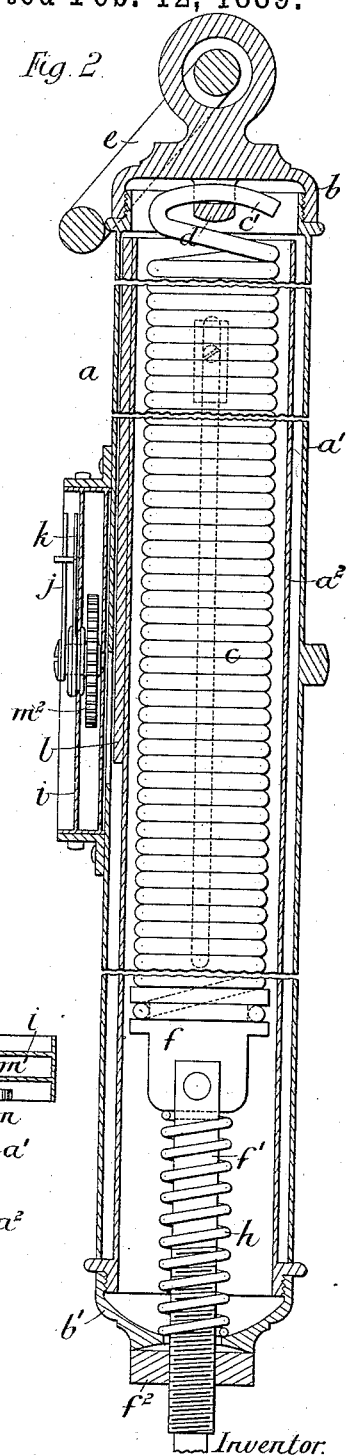
Witnesses:
L. B. Whitaker
H. R. Mack
Inventor:
Richard Rood
By his attys
Whitaker & Prevost

UNITED STATES PATENT OFFICE.

RICHARD ROOD, OF PORTSWOOD, SOUTHAMPTON, ENGLAND.

REGISTER FOR SHIPS' LOGS.

SPECIFICATION forming part of Letters Patent No. 397,661, dated February 12, 1889.

Application filed April 12, 1888. Serial No. 270,409. (No model.) Patented in England June 1, 1887, No. 7,914.

*To all whom it may concern:*

Be it known that I, RICHARD ROOD, a subject of the Queen of Great Britain, residing at Portswood, Southampton, England, have invented a new and useful Improved Instrument or Log for Registering the Speed of Vessels, (for which a patent was granted me in Great Britain June 1, 1887, No. 7,914,) of which the following is a specification.

My invention relates to an improved instrument or log chiefly designed for registering the speed of vessels.

Instruments of this class as heretofore constructed are usually designed to be dragged through the water, and are thereby liable to be lost—for, instance, by becoming entangled with wreckage, timber, baskets, weeds, or other floating objects; also, in most cases a considerable time has to elapse before the speed can be ascertained.

The chief object of my invention is to provide a registering-instrument which can be retained aboard a vessel, so that there is very little likelihood of its being lost overboard, and whereby the speed of the vessel can be at once ascertained.

To this end the said invention comprises the improvements hereinafter described.

In the accompanying drawings, Figure 1 is a front elevation of an instrument constructed according to my invention; and Fig. 2 is a vertical section of the same on the line $x\ x$, Fig. 1; and Fig. 3 is a horizontal section on the line $y\ y$.

$a$ is a metal case, which, as shown, comprises two circular tubes, $a'\ a^2$, telescoping one within the other, and closed at their outer ends by caps $b\ b'$, respectively.

$c$ is a spiral spring, which is located in the case $a$, and firmly secured at one end, $c'$, to the part $a'$ of the case. As shown, the end of the said spring is attached to a projection, $d$, formed on the cap $b$, to which latter a ring, $e$, is attached. The other end of the said spring is attached to a plate, $f$, as shown in Fig. 2, which plate is provided with a screw-threaded rod, $f'$, projecting through the cap $b'$ and carrying a nut, $f^2$, having an opening, $g$, to which a line can be attached.

$h$ is a spiral spring, which is placed around the rod $f'$ between the plate $f$ and the cap $b'$, the said spring serving to maintain the nut in close contact with the cap $b'$, to allow of adjusting the tension of the spring, and especially to prevent any sudden jarring of the instrument, which would necessarily occur if the connection between the rod and cap were rigid.

$i$ is a dial, which is secured to the part $a'$ of the case $a$, and which may be graduated in any desired manner—say with miles or knots; and $j$ is a hand or pointer, which is adapted to move over the same.

$k$ is an auxiliary pointer, which serves to indicate the extreme speed at which a vessel has been running, as indicated by the pointer $j$. This auxiliary hand $k$ is mounted loosely on the same shaft with the hand $j$, and is moved forward on the dial by means of a pin with which said hand $j$ is provided.

$l$ is a rack, which is secured to the part $a^2$ of the case, and which is connected with the hand $j$ through the medium of the gear-wheels $m\ m'\ m^2$, the latter wheel being upon the shaft of the hand $j$, so that any movement of the part $a'$ relatively to the part $a^2$ will be indicated upon the dial.

A finger or pointer can, if desired, be secured to the part $a^2$ of the case and be passed through a slot in the part $a'$, upon the edge of which is marked a scale of miles or knots.

To the opening $g$ in the nut $f^2$ is attached a cord or line, to which a plummet or weight of egg shape or other desirable form is secured.

The operation of my improved log or instrument is as follows—that is to say: The ring $e$ is firmly secured to some fixed part of the vessel where the scale can be easily seen, or it can be held in the hand, and the plummet is then thrown overboard. The pressure of the water upon the plummet as it is drawn forward with the ship causes the expansion of the spring $c$, whereby the part $a^2$ of the case $a$ is caused to move within the part $a'$, the index-finger indicating upon the dial or scale the speed of the vessel. In practice I prefer to fix the instrument permanently in any place at which it is desirable that the speed of the vessel should be indicated—for instance, in the captain's cabin—the plummet line or connection being passed directly through the bottom of the vessel and over suitable pulleys to obviate as far as possible the breakage of the same.

It is to be understood that the graduations of the scale are dependent upon the strength of the spring and the weight of the plummet.

To adjust the tension of the spring according to the size and shape of the plummet used and to adjust the spring to the graduations on the dial, I rotate the nut $f^2$ in one or the other direction, whereby the spring is more or less expanded or allowed to contract.

Although I have described the use of a spiral spring, any other suitable form of spring or its equivalent can be used therefor—for instance, an elliptical spring could be employed, the motion of the two parts of the spring relatively to each other being utilized to move a hand over a scale; also, instead of making the case round in transverse section, as hereinbefore described, it may be square or of any other desirable form.

My improved instrument, besides serving to indicate the speed of a vessel, may also be used to indicate the speed of a current in which a vessel is lying.

Another great advantage is that in case the line becomes entangled in wreckage or the like the only loss liable to occur is that of the plummet.

Having now particularly described and ascertained the nature of my said invention and in what manner the same is to be performed, I declare that what I claim is—

1. In a ship-log, the combination, with two telescoping tubes, one of which is provided with a dial and indicator, of a spring secured to the closed end of one of the tubes, a rod attached to said spring and passing through the closed end of the other tube, and a spring-connection between said closed end and rod, substantially as described.

2. In a ship-log, the combination, with two telescoping tubes, one of which is provided with a dial and indicator, of a spring secured to the closed end of one of the tubes, a plate provided with a screw-threaded rod which passes through the closed end of the other tube, a spring interposed between the plate and the said closed end of the tube, and a nut for said rod, substantially as described.

3. In a ship-log, the combination, with two telescoping tubes, of a dial attached to one of the tubes, a shaft passing through said dial in gear with a rack upon the other tube, and two hands mounted on said shaft, one of said hands being capable of movement in one direction only, substantially as described and shown.

RICHARD ROOD.

Witnesses:
JOHN G. FAY,
J. M. SOPER.